Patented Dec. 11, 1951

2,578,144

UNITED STATES PATENT OFFICE 2,578,144

CATALYST FOR THE REACTION OF CARBON MONOXIDE AND HYDROGEN WITH UNSATURATED COMPOUNDS

Wallace A. McMillan, Glenham, N. Y., assignor to The Texas Company, New York, N. Y., a corporation of Delaware No Drawing. Application April 15, 1949, Serial No. 87,832

4 Claims. (Cl. 260—604)

This invention relates to a process for effecting reaction between unsaturated compounds, carbon monoxide and hydrogen. More specifically, this invention discloses a novel catalyst which may be used in the reaction between carbon monoxide, hydrogen and unsaturated compounds or compounds which act as unsaturated compounds under reaction conditions.

This invention consists of the discovery that cobalt salts of acetyl acetone are catalysts for the conversion of olefins, carbon monoxide and hydrogen to carbonylic compounds. Cobalt acetyl acetonate, which may exist either in the form of the cobaltous salt, the cobaltic salt or a mixture thereof, is a crystalline solid which is soluble in a number of organic solvents. Cobalt salts of acetyl acetone are excellent catalyst supplements in conversions employing conventional cobalt catalysts since it lends itself to easy intermittent or continuous introduction into a reaction zone during conversion.

The carbonylation reaction, the appelation which will be henceforth used to describe the reaction of olefins, carbon monoxide and hydrogen to form carbonylic compounds, can be effected with cobalt salts of acetyl acetone as the sole source of catalyst. Excellent yields are obtained with cobalt acetyl acetonate as the catalyst; they approximate the yields obtained with conventional cobalt catalysts such as standard cobalt catalyst comprising 32 per cent cobalt, 64 per cent uncalcined diatomaceous earth, 3 per cent magnesia and 1 per cent thoria. An important application of the catalytic activity of the cobalt salt of acetyl acetone is as a supplement to carbonylation reactions employing conventional cobalt catalysts. As was indicated previously, cobalt acetyl acetonate is soluble in a number of organic solvents and is readily introduced in the form of a slurry or solution into a reaction zone containing a conventional cobalt catalyst.

The carbonylation reaction is characterized by the fact that cobalt carbonyl and/or cobalt hydrocarbonyl are formed by the reaction of metallic cobalt with carbon monoxide and hydrogen under the conditions of mild temperature and elevated pressure required for the reaction. They are regarded as active catalytic ingredients and are soluble in the products of conversion in which they are continuously removed from the reaction zone. A further characteristic of the carbonylation reaction is the relatively short catalyst life of conventional cobalt catalysts. The short catalyst life coupled with the continuous loss of catalyst from the reaction zone in the form of cobalt carbonyl makes it difficult to maintain high conversion efficiency for an extended duration in commercial operation. The present invention makes available a soluble cobalt catalyst which may be continuously introduced into the reaction zone to replace cobalt carbonyl. Moreover, the continuous introduction of a cobalt salt of acetyl acetone into the reaction zone maintains conversion efficiency at a high level.

Fixed bed, fluidized fixed bed, continuous slurry and batch slurry are the types of operation that have been suggested and are ordinarily employed for the carbonylation reaction. The novel catalyst of this invention may be used with any of the aforementioned operating techniques. Moreover, cobalt salts of acetyl acetone can be continuously introduced into a carbonylation reaction effected with conventional cobalt catalysts using any of the aforementioned operating techniques.

The carbonylation reaction is effected at temperatures between 100 and 400° F. and at pressures between 200 and 5,000 pounds per square inch. Temperatures of 150 to 350° F. and pressures of 1,500 to 3,500 pounds per square inch have been found to be particularly effective for the carbonylation reaction. The carbonylation reaction, employing a cobalt salt of acetyl acetone as a catalyst or as a supplement for conventional cobalt catalyst, is effected at the aforedescribed conditions of temperature and pressure which have been found to be advantageous for the carbonylation reaction employing a conventional cobalt catalyst.

Cobalt salts of acetyl acetone exist in cobaltous and cobaltic forms for which the following formulas have been proposed:

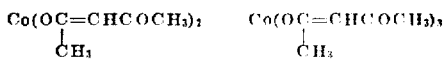

Cobalt salts of acetyl acetone are available commercially. However, cobaltous acetyl acetonate is advantageously freshly prepared by reacting cobaltous nitrate with sodium hydroxide to form cobaltous hydroxide which, after filtration and washing, is reacted with acetyl acetone to yield rose-colored crystals; the rose-colored crystals of cobaltous acetyl acetonate are purified by recrystallization from hot acetone.

Cobalt salts of acetyl acetone are soluble in acetone, methylethylketone, diethylketone, and ethyl alcohol. They can be continuously introduced into the reaction zone of a carbonylation reaction employing a conventional cobalt metal in a solution of a solvent such as ethyl alcohol.

The following examples illustrate the use of cobalt salts of acetyl acetone as catalysts for the carbonylation reaction. The reaction of hexylene with carbon monoxide and hydrogen to prepare heptaldehyde is employed to illustrate the use of the catalyst of this invention for the carbonylation reaction.

Example I

Twenty grams of a cobalt salt of acetyl acetone and 240 grams of hexylene-1 were charged to a stirred batch reactor capable of withstanding elevated pressures. The reactor was then pressured with carbon monoxide and hydrogen in a 1:1 ratio to approximately 2,400 pounds per square inch. The batch reactor was then raised to a temperature of approximately 300° F. while the reaction mixture was agitated. The reactants were stirred in the reactor for 12 hours during which time additional carbon monoxide and hydrogen were added so as to maintain the reaction pressure between 1,290 pound per square inch and 2,400 pounds per square inch. Three hundred and twenty-four grams of product were obtained and were immediately hydrogenated over Raney nickel at 350° F. and at a hydrogen pressure of 3,700 to 5,600 pounds per square inch for a period of 74 hours. The hydrogenated product was then fractionated to yield a major fraction, approximately 54 per cent, boiling in the range of 327 to 340° F. which is approximately that expected for a mixture of methyl hexyl alcohol and n-heptyl alcohol, the primary alcohols obtained by hydrogenation of the $C_7$ aldehydes resulting from the carbonylation of hexylene-1. This fraction was better than 80 per cent $C_7$ alcohols as indicated by its hydroxyl number.

Example II

Twenty grams of cobalt salt of acetyl acetone and 247 grams of hexylene-1 were charged to a batch reactor similar to that used in Example 1. The reactor was then pressure with carbon monoxide and hydrogen in a 1:1 ratio to approximately 2,870 pounds per square inch. The batch reactor was then raised to a temperature of approximately 303° F. while the reaction mixture was agitated. The reactants were stirred in the reactor for 13¾ hours during which time additional carbon monoxide and hydrogen were added so as to maintain the reaction pressure between 1,510 pounds per square inch and 2,870 pounds per square inch. These hundred and fifty-one grams of product were obtained and were immediately hydrogenated over Raney nickel at 350° F. and at a hydrogen pressure of 4,600 to 5,450 pounds per square inch for a period of 67 hours. The hydrogenated product was then fractionated to yield a major fraction, approximately 53 per cent, boiling in the range of 327 to 350° F. This fraction was better than 80 per cent $C_7$ alcohols as indicated by its hydroxyl number.

The above examples illustrate the use of a cobalt salt of acetyl acetone as a catalyst for the carbonylation reaction. It must be remembered that cobalt salts of acetyl acetone are extremely useful as a catalyst supplement for carbonylation reactions employing conventional cobalt catalysts. The introduction of a cobalt salt of acetyl acetone into a reaction zone using a conventional cobalt catalyst such as standard cobalt catalyst is effected either continuously or intermittently. If a liquid olefin is charged to the reaction zone, a cobalt salt of acetyl acetone may be dissolved or slurried therein. In the case of carbonylation reaction using normally gaseous olefins, a cobalt salt of acetyl acetone may be added to the reaction zone in a slurry or in a solution of a solvent such as acetone or ethyl alcohol.

Obviously many modifications and variations of the invention, as hereinbefore set forth, may be made without departing from the spirit and scope thereof and, therefore, only such limitations should be imposed as are indicated in the appended claims.

I claim:

1. A method for preparing carbonylic compounds which comprises reacting olefins, carbon monoxide and hydrogen in the presence of a cobalt salt of acetyl acetone.

2. A method for preparing carbonylic compounds which comprises reacting olefins, carbon monoxide and hydrogen at a temperature of 100 to 400° F. and at a pressure of 200 to 5,000 pounds per square inch in the presence of a cobalt salt of acetyl acetone.

3. A method for preparing carbonylic compounds which comprises reacting olefins, carbon monoxide and hydrogen under suitable conditions, temperature and pressure in the presence of a metallic cobalt catalyst and adding a cobalt salt of acetyl acetone during said reaction.

4. A method for preparing carbonylic compounds which comprises reacting olefins, carbon monoxide and hydrogen at a temperature of 100° F. to 400° F. and at a pressure of 200 to 500 pounds p. s. i. in the presence of a catalyst comprising a cobalt salt of acetyl acetone in combination with a metallic cobalt catalyst.

WALLACE A. McMILLAN.

REFERENCES CITED

The following references are of record in the file of this patent:

UNITED STATES PATENTS

| Number | Name | Date |
|---|---|---|
| 1,876,270 | Zorn | Sept. 6, 1932 |

OTHER REFERENCES

Fiat Final Report 1000, PB–81383 Dec. 26, 1947, pages 11 to 16 and 29.

Certificate of Correction

Patent No. 2,578,144

December 11, 1951

WALLACE A. McMILLAN

It is hereby certified that error appears in the printed specification of the above numbered patent requiring correction as follows:

Column 3, line 46, for "pressure" read *pressured*; line 56, for "These" read *Three*;

and that the said Letters Patent should be read as corrected above, so that the same may conform to the record of the case in the Patent Office.

Signed and sealed this 25th day of March, A. D. 1952.

[SEAL]

THOMAS F. MURPHY,
*Assistant Commissioner of Patents.*

Certificate of Correction

Patent No. 2,578,144                                              December 11, 1951

WALLACE A. McMILLAN

It is hereby certified that error appears in the printed specification of the above numbered patent requiring correction as follows:

Column 3, line 46, for "pressure" read *pressured*; line 56, for "These" read *Three*;

and that the said Letters Patent should be read as corrected above, so that the same may conform to the record of the case in the Patent Office.

Signed and sealed this 25th day of March, A. D. 1952.

[SEAL]

THOMAS F. MURPHY,
*Assistant Commissioner of Patents.*